United States Patent
Shimizu

(10) Patent No.: US 7,573,950 B2
(45) Date of Patent: Aug. 11, 2009

(54) IBOC BROADCASTING RECEIVER

(75) Inventor: Yasuhiro Shimizu, Kanagawa (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 718 days.

(21) Appl. No.: 10/869,141

(22) Filed: Jun. 16, 2004

(65) Prior Publication Data

US 2004/0261132 A1   Dec. 23, 2004

(30) Foreign Application Priority Data

Jun. 20, 2003   (JP) .............................. 2003-175763

(51) Int. Cl.
*H03K 9/00*   (2006.01)
(52) U.S. Cl. ...................... 375/316; 318/701; 320/146; 324/222; 324/223; 327/205; 377/97
(58) Field of Classification Search ................ 370/334; 455/192.2, 296; 725/139, 131, 151
See application file for complete search history.

(56) References Cited

U.S. PATENT DOCUMENTS

| | | | |
|---|---|---|---|
| 5,970,046 A | 10/1999 | Takegahara et al. | |
| 6,118,773 A * | 9/2000 | Todd | 370/334 |
| 6,178,317 B1 * | 1/2001 | Kroeger et al. | 455/296 |
| 6,430,227 B1 | 8/2002 | Kroeger et al. | |
| 7,254,169 B1 * | 8/2007 | Steiner et al. | 375/227 |
| 2004/0022229 A1 * | 2/2004 | Vanness | 370/343 |

* cited by examiner

*Primary Examiner*—David C Payne
*Assistant Examiner*—Adolf Dsouza
(74) *Attorney, Agent, or Firm*—Hogan & Hartson LLP

(57) ABSTRACT

An IBOC broadcasting receiver that uses two different bit error rates as threshold values in receiving hybrid broadcasting in a simultaneous broadcasting format, and switches between digital broadcasting reception and analog broadcasting reception based on the two threshold values. The IBOC broadcasting receiver counts the number of occurrences of switching between digital broadcasting reception and analog broadcasting reception in a specified period of time, and increases a hysteresis width between the two threshold values when the number of occurrences of switching counted exceeds a specified number. Further, the counter of the IBOC broadcasting receiver counts the number of occurrences of switching of broadcasting receptions in a specified period of time by using another set of threshold values changed as a result of the increased hysteresis width, and reduces the hysteresis width between the another set of threshold values when the number of occurrences of switching counted is less than the specified number.

9 Claims, 1 Drawing Sheet

IBOC BROADCASTING RECEIVER

BACKGROUND OF THE INVENTION

1. Field of the Invention

The present invention relates to In-Band-On-Channel (IBOC) broadcasting receivers, and more particularly, to IBOC broadcasting receivers which receive broadcasting from an IBOC broadcasting station that broadcasts analog sideband and digital information allocated in outer frequency bands of the analog sideband with the same broadcasting frequencies.

2. Description of the Related Arts

IBOC broadcasting that broadcasts analog sidebands and digital information allocated in outer frequency bands of the analog sidebands with the same broadcasting frequencies is known. The IBOC broadcasting is generally divided into two broadcasting modes. One of them is a full-digital broadcasting mode that transmits only digital broadcasting, and the other is a hybrid broadcasting mode that transmits analog broadcasting and digital broadcasting coexisting together. In the IBOC hybrid broadcasting, conventional broadcasting receivers can receive analog broadcast portions of the IBOC hybrid broadcasting.

In the IBOC hybrid broadcasting, an IBOC broadcasting station simultaneously transmits analog broadcasting and digital broadcasting. In this instance, the hybrid broadcasting may be conducted in a simultaneous broadcasting format in which identical broadcasting contents are transmitted in analog broadcasting and digital broadcasting. By using the simultaneous broadcasting format, a blending function to switch receptions between analog broadcasting and digital broadcasting depending on broadcasting receiving conditions can be realized. Bit error rates in the digital broadcasting are used as the basis for judging as to when to switch receptions between analog broadcasting and digital broadcasting by the blending function.

However, in the case of mobile reception which may take place with on-vehicle tuners, signal receiving conditions may substantially change. For example, when a vehicle with an on-vehicle tuner moves through areas where buildings in different heights are densely located, signal receiving conditions may substantially change due to the buildings. In this case, receptions of analog broadcasting and digital broadcasting may be frequently switched from one to the other by the blending function. However, the frequent switching of the formats of broadcasting would psychologically stress listeners who receive the broadcasting. Occurrence of such an incident should preferably be avoided.

As a method to switch broadcasting formats on the side of a broadcasting receiver according to conditions of broadcasting reception, a broadcasting reception method used in the hierarchical transmission system that is conducted in digital BS broadcasting is known. When switching classes in the hierarchy according to this method, two fixed threshold values are used to switch from a higher class to a lower class and from a lower class to a higher class, thereby providing the hierarchical switching with hysteresis.

The switching method described above is effective when substantial changes in broadcasting reception conditions are not frequently observed in a short period of time. Since changes in the weather that may result in switching of broadcasting formats would not occur in a short period of time, the above-described method used in the digital BS broadcasting to switch broadcasting can prevent chattering due to such switching caused by changes in the weather.

On the other hand, when mobile reception is conducted with an IBOC broadcasting receiver, substantial changes in reception conditions can be expected to occur in a short period of time, and the above-described switching method alone cannot prevent chattering due to switching of broadcasting formats.

SUMMARY OF THE INVENTION

The present invention relates to IBOC broadcasting receivers that can suppress chattering caused by broadcasting switching between analog broadcasting and digital broadcasting even in environments where reception conditions substantially change in a short period of time.

In accordance with an embodiment of the present invention, an IBOC broadcasting receiver uses two different bit error rates as threshold values in receiving hybrid broadcasting in a simultaneous broadcasting format and switches between digital broadcasting reception and analog broadcasting reception based on the two threshold values. In one aspect, the IBOC broadcasting receiver may include a counter that counts the number of occurrences of switching of broadcasting receptions in a specified period of time, and a hysteresis changing device that increases a hysteresis width between the two threshold values when the number counted by the counter exceeds a specified number. Further, the counter of the IBOC broadcasting receiver counts the number of occurrences of switching of broadcasting receptions in a specified period of time by using another set of threshold values obtained as a result of the increased hysteresis width, and the hysteresis changing device reduces the hysteresis width between the another set of threshold values when the number counted by the counter becomes less than the specified number.

According to the IBOC broadcasting receiver, two different bit error rates are used as threshold values in receiving hybrid broadcasting in a simultaneous broadcasting format, and digital broadcasting reception and analog broadcasting reception are switched from one to the other based on the two threshold values. According to the IBOC broadcasting receiver of the present invention, the number of occurrences of switching of broadcasting receptions is counted in a specified period of time, and a hysteresis width between the two threshold values is changed when the number counted reaches a first specified number. In a preferred embodiment, the hysteresis width between the two threshold values may be increased when the number counted exceeds the specified number. Further, the number of occurrences of switching of broadcasting receptions is counted in a specified period of time by using another set of threshold values obtained as a result of the increased hysteresis width, and the hysteresis width between the another set of threshold values is changed when the number counted reaches a second specified number. Preferably, the hysteresis width between the another set of threshold values is reduced when the number counted becomes to be less the second specified number. The first specified number and the second specified number can be the same or different from one another. As a result, chattering caused by broadcasting reception switching between analog broadcasting and digital broadcasting can be suppressed even in environments where reception conditions substantially change in a short period of time.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

An IBOC broadcasting receiver in accordance with an embodiment of the present invention is described below with reference to the accompanying drawings.

Figure 1:
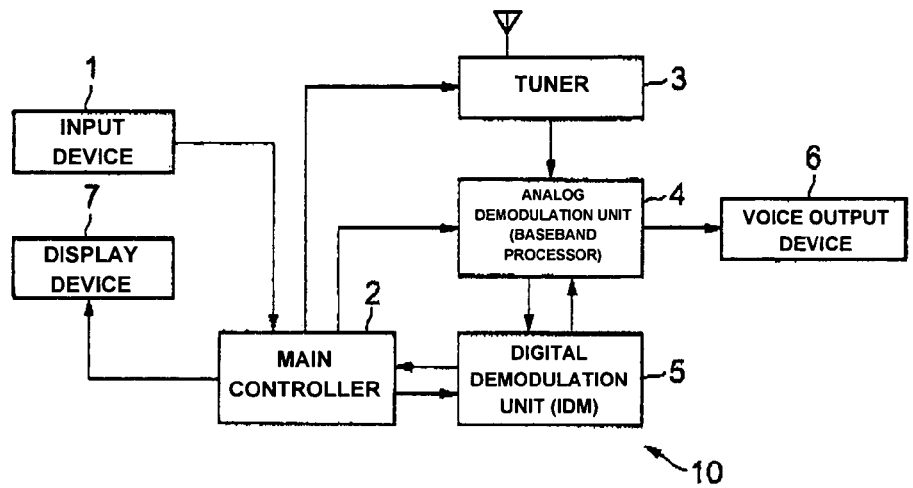
FIG. 1 is a simplified block diagram of an IBOC broadcasting receiver in accordance with an embodiment of the present invention.

FIG. 1 is a simplified block diagram of an IBOC broadcasting receiver 10 in accordance with an embodiment of the present invention.

The IBOC broadcasting receiver 10 of the present embodiment includes an input device 1 for inputting instructions, a main controller 2 that receives inputs of instruction signals inputted from the input device 1, a tuner 3, an analog demodulation unit 4, a digital demodulation unit (IDM) 5, a voice output device 6, and a display device 7. The tuner 3 is controlled based on outputs from the main controller 2. The analog demodulation unit 4 includes a baseband processor and is controlled based on outputs from the main controller 2. The analog demodulation unit 4 receives an intermediate-frequency signal and a digital audio signal to be described below which are outputted from the tuner 3, and analog-demodulates the inputted signals. The digital demodulation unit 5 is controlled based on outputs from the main controller 2, receives a digital baseband signal that is processed by the baseband processor of the analog demodulation unit 4, digital-demodulates the inputted digital baseband signal into a digital audio signal, and outputs the digital audio signal to the analog demodulation unit 4. The voice output device 6 receives voice signals from the analog demodulation unit 4, and converts the voice signals into audible sound. The display device 7 displays, under the control of the main controller 2, information including contents of operation based on operation instructions inputted at the input device 1.

The digital demodulation unit 5 of the IBOC broadcasting receiver 10 described above is equipped with a bit error rate detection section (not shown) that detects bit error rates. The main controller 2 is equipped with a memory unit, a counter unit and a threshold update device (not shown). The memory unit stores a first threshold value and a second threshold value, which are used for receiving hybrid broadcasting in a simultaneous broadcasting format. Based on bit error rates, the first threshold value is used for switching digital broadcasting reception to analog broadcasting reception, and the second threshold value is used for switching analog broadcasting reception to digital broadcasting reception. The counter unit counts the number of occurrences of switching between digital broadcasting reception and analog broadcasting reception during a specified period of time. The threshold update device updates an interval between the first threshold value and the second threshold value when the number counted by the counter unit exceeds a specified value to thereby provide a set of updated first and second threshold values, and stores the updated first and second threshold values in the memory unit.

When a person listening to the broadcasting received instructs the IBOC broadcasting receiver 10 to perform hybrid reception through the input device 1, and when the main controller 2 judges that hybrid broadcasting being received is in a simultaneous broadcasting format, the IBOC broadcasting receiver 10 switches analog broadcasting reception and digital broadcasting reception from one to the other depending on broadcasting reception conditions.

In this instance, whether or not the hybrid broadcasting is in a simultaneous broadcasting format is judged based on information regarding simultaneous broadcasting format contained in the demodulated digital data provided by the digital demodulation unit 5. Under the control of the main controller 2 that received the judged information regarding simultaneous broadcasting format, the analog demodulation unit 4 switches its outputs to thereby switch analog broadcasting reception and digital broadcasting reception from one to the other depending on broadcasting reception conditions.

Switching from analog broadcasting reception to digital broadcasting reception and vice verse based on broadcasting reception conditions are described below in greater detail with reference to FIGS. 2(a) and 2(b).

Figure 2:
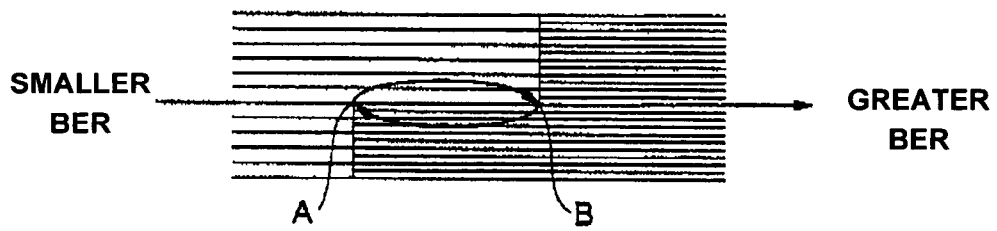
FIGS. 2(a) and 2(b) are schematic representations for describing the functions of an IBOC broadcasting receiver in accordance with an embodiment of the present invention.
Figure 2:
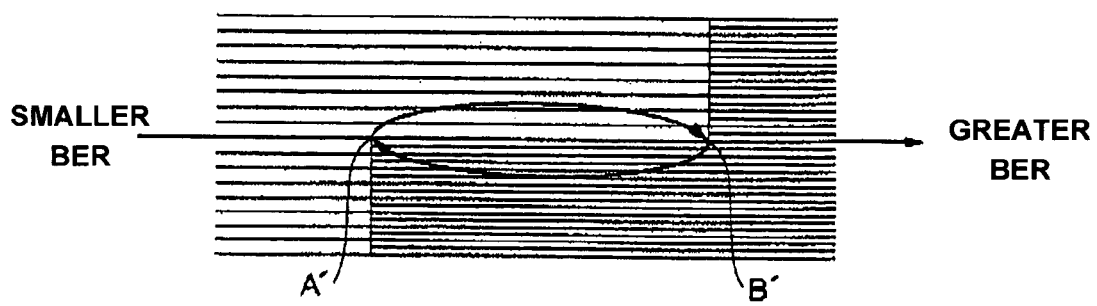

When the bit error rate in a state to receive hybrid broadcasting in a simultaneous broadcasting format deteriorates, and when the bit error rate detection unit judges that the bit error rate exceeds a second threshold value (B) that is read out from the memory unit, as indicated in FIG. 2(a), a digital broadcasting reception state (schematically indicated with rough lines) is switched to an analog broadcasting reception state (schematically indicated with fine lines). While receiving the hybrid broadcasting in this state, when the bit error rate improves and the bit error rate detection unit judges that the bit error rate becomes to be less than a first threshold value (A), the analog broadcasting reception state is switched to the digital broadcasting reception state, as indicated in FIG. 2(a).

A width or a separation between the first threshold value (A) and the second threshold value (B) defines a hysteresis width.

In the state in which the bit error rate is monitored with the first threshold value (A) and the second threshold value (B), the number of occurrences of switching between the analog broadcasting reception state and the digital broadcasting reception state is counted in a specified period of time. When the counted number exceeds a specified number, the first threshold value (A) and the second threshold value (B) stored in the memory unit are updated to a first threshold value (A') and a second threshold value (B'), respectively. Assuming that the direction in which the error bit rate increases is a positive direction, the first threshold value (A) is set to the first threshold value (A') which is smaller than the first threshold value (A) (i.e., the first threshold value (A)>the first threshold value (A')), and the second threshold value (B) is set to the second threshold value (B') which is greater than the second threshold value (B) (i.e., the second threshold value (B)<the second threshold value (B')). As a result, the separation between the two threshold values (the first threshold value (A') and the second threshold value (B')), in other words, the hysteresis width is increased.

The state in which the hysteresis width is increased is indicated in FIG. 2(b). In the state in which the hysteresis width is increased, the IBOC broadcasting receiver 10 receives the hybrid broadcasting. When the bit error rate deteriorates, and the detection unit judges that the bit error rate exceeds the second threshold value (B'), a digital broadcasting reception state is switched to an analog broadcasting reception state. While receiving the hybrid broadcasting in this state, when the bit error rate improves and the bit error rate detection unit judges that the bit error rate becomes to be less than the first threshold value (A'), the analog broadcasting reception state is switched to the digital broadcasting reception state, as indicated in FIG. 2(b).

In the state of receiving the hybrid broadcasting in which the bit error rate is monitored with the first threshold value (A') and the second threshold value (B'), the number of occurrences of switching between the analog broadcasting reception state and the digital broadcasting reception state is counted in a specified period of time. When the counted number becomes to be less than a specified number, the first and second threshold values stored in the memory unit are returned to the state indicated in FIG. 2(a), in other words, the first threshold value (A') and the second threshold value (B') stored in the memory unit are updated to the first threshold value (A) and the second threshold value (B), respectively. As a result, the hysteresis width is narrowed.

As a result, chattering caused by frequent switching between analog broadcasting reception and digital broadcasting reception can be suppressed even in environments where broadcasting reception conditions substantially change in a short period of time.

By the IBOC broadcasting receiver in accordance with the present invention, the number of occurrences of switching between analog broadcasting reception and digital broadcasting reception is counted in a specified period of time, and a hysteresis width between two threshold values to be used for switching between analog broadcasting reception and digital broadcasting reception is increased when the counted number exceeds a specified number.

Furthermore, by using the threshold values with the increased hysteresis width, the number of occurrences of switching between analog broadcasting reception and digital broadcasting reception is counted in a specified period of time, and the hysteresis width between the two threshold values to be used for switching between analog broadcasting reception and digital broadcasting reception is reduced when the counted number becomes to be less than a specified number. As a result, chattering caused by frequent switching between analog broadcasting reception and digital broadcasting reception can be suppressed even in environments where substantial changes in broadcasting reception conditions frequently occur in a short period of time.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An IBOC broadcasting receiver that uses two different bit error rates as threshold values in receiving hybrid broadcasting in a simultaneous broadcasting format and switches between digital broadcasting reception and analog broadcasting reception based on the two threshold values; the IBOC broadcasting receiver comprising:
a counter unit that counts the number of occurrences of switching between digital broadcasting reception and analog broadcasting reception in a specified period of time; and
a control device that changes a hysteresis width between the two threshold values when the number counted by the counter unit reaches a specified number,
wherein the counter unit counts the number of occurrences of switching between digital broadcasting reception and analog broadcasting reception in a specified period of time by using another set of threshold values obtained as a result of the increased hysteresis width, and the control device changes the hysteresis width between the another set of threshold values when the number counted by the counter unit reaches a specified number.

2. An IBOC broadcasting receiver according to claim 1, wherein the control device reduces the hysteresis width between the another set of threshold values when the number counted by the counter unit is less than the specified number.

3. An IBOC broadcasting receiver that receives hybrid broadcasting in a simultaneous broadcasting format, the IBOC broadcasting receiver comprising:
a memory device that stores a set of different bit error rates as threshold values;
a switching device that switches between digital broadcasting reception and analog broadcasting reception based on the threshold values;
a counter unit that counts the number of occurrences of switching between digital broadcasting reception and analog broadcasting reception in a specified period of time; and
a control device that changes the threshold values stored in the memory device when the number counted by the counter unit reaches a specified number,
wherein the counter unit counts the number of occurrences of switching between digital broadcasting reception and analog broadcasting reception in a specified period of time by using the threshold values changed by the control device, and the control device changes the threshold values stored in the memory device when the number counted by the counter unit reaches a specified number.

4. An IBOC broadcasting receiver according to claim 3, wherein the control device changes the threshold values to change a hysteresis width between the threshold values.

5. An IBOC broadcasting receiver according to claim 4, wherein the hysteresis width between the threshold values is reduced.

6. An IBOC broadcasting receiver according to claim 3, wherein the control device changes the threshold values by increasing one of the threshold values and decreasing another of the threshold values to change a hysteresis width between the threshold values.

7. An IBOC broadcasting receiver according to claim 6, wherein the hysteresis width between the threshold values is decreased.

8. An IBOC broadcasting receiver that receives hybrid broadcasting in a simultaneous broadcasting format, the IBOC broadcasting receiver comprising:
a switching device that switches between digital broadcasting reception and analog broadcasting reception based on a set of predetermined different bit error rates separated by a first hysteresis width;
a counter unit that counts the number of occurrences of switching between digital broadcasting reception and analog broadcasting reception in a specified period of time; and
a control device that changes the first hysteresis width to a second hysteresis width when the number counted by the counter unit exceeds a specified number,
wherein the counter unit counts the number of occurrences of switching between digital broadcasting reception and analog broadcasting reception in a specified period of time by using the threshold values separated by the second hysteresis width, and the control device changes the second hysteresis width to the first hysteresis width when the number counted by the counter unit becomes less than the specified number.

9. An IBOC broadcasting receiver that receives hybrid broadcasting in a simultaneous broadcasting format, the IBOC broadcasting receiver comprising:

a switching device that switches between digital broadcasting reception and analog broadcasting reception based on a set of predetermined different bit error rates separated by a first hysteresis width;

a counter unit that counts the number of occurrences of switching between digital broadcasting reception and analog broadcasting reception in a specified period of time; and a control device that changes the first hysteresis width to a second hysteresis width when the number counted by the counter unit exceeds a specified number, wherein the second hysteresis width is greater than the first hysteresis width, and the set of predetermined different bit error rates includes a first bit error rate and a second bit error rate greater than the first bit error rate, and the control device changes the first hysteresis width to the second hysteresis width by changing the first bit error rate to a third bit error rate smaller than the first bit error rate, and the second bit error rate to a fourth bit error rate greater than the second bit error rate.

* * * * *